US012671164B2

(12) United States Patent
Wu et al.

(10) Patent No.: US 12,671,164 B2
(45) Date of Patent: Jun. 30, 2026

(54) ELECTRONIC DEVICE

(71) Applicant: PEGATRON CORPORATION, Taipei City (TW)

(72) Inventors: Chien-Yi Wu, Taipei City (TW); Hau Yuen Tan, Taipei City (TW); Chao-Hsu Wu, Taipei City (TW); Chih-Wei Liao, Taipei City (TW); Chia-Hung Chen, Taipei City (TW); Chen-Kuang Wang, Taipei City (TW); Wen-Hgin Chuang, Taipei City (TW); Chia-Hong Chen, Taipei City (TW); Hsi Yung Chen, Taipei City (TW)

(73) Assignee: Pegatron Corporation, Taipei City (TW)

( * ) Notice: Subject to any disclaimer, the term of this patent is extended or adjusted under 35 U.S.C. 154(b) by 286 days.

(21) Appl. No.: 18/361,756

(22) Filed: Jul. 28, 2023

(65) Prior Publication Data

US 2024/0072411 A1 Feb. 29, 2024

(30) Foreign Application Priority Data

Aug. 24, 2022 (TW) ................................ 111131820

(51) Int. Cl.

*H01Q 1/22* (2006.01)
*H01Q 5/40* (2015.01)
*H01Q 9/04* (2006.01)

(52) U.S. Cl.

CPC ................ *H01Q 1/22* (2013.01); *H01Q 5/40* (2015.01); *H01Q 9/045* (2013.01)

(58) Field of Classification Search

None

See application file for complete search history.

(56) References Cited

U.S. PATENT DOCUMENTS

| | | | | |
|---|---|---|---|---|
| 2014/0078008 A1* | 3/2014 | Kang | H01Q 5/35 | 343/702 |
| 2015/0263428 A1* | 9/2015 | Liou | H01Q 9/42 | 343/702 |
| 2019/0181555 A1* | 6/2019 | Lee | H01Q 3/247 | |
| 2019/0372223 A1* | 12/2019 | Hsu | H01Q 1/241 | |

(Continued)

FOREIGN PATENT DOCUMENTS

| | | |
|---|---|---|
| CN | 214957306 | 11/2021 |
| CN | 216354782 | 4/2022 |

*Primary Examiner* — Dameon E Levi
*Assistant Examiner* — Anh Ho

(57) ABSTRACT

An electronic device includes a metal back cover, a metal frame, a first antenna module and a second antenna module. The metal frame includes a first and a second disconnection portion, a first and a second connection portion. The first and the second connection portion are connected to the metal back cover. The first disconnection portion is separated from the first connection portion, the metal back cover and the second disconnection portion to form a first slot. The second disconnection portion is connected to the second connection portion and is separated from the metal back cover to form a second slot. The first antenna module is connected to the first disconnection portion, and forms a first antenna path. The second antenna module is connected to the second disconnection portion, and forms a second and a third antenna path with the second disconnection portion and the metal back cover.

12 Claims, 7 Drawing Sheets

(56) References Cited

U.S. PATENT DOCUMENTS

| | | | | |
|---|---|---|---|---|
| 2021/0111486 | A1* | 4/2021 | Tamrakar | H01Q 9/42 |
| 2022/0359996 | A1* | 11/2022 | Yu | H01Q 1/241 |
| 2023/0223677 | A1* | 7/2023 | Wu | H01Q 1/243<br>343/702 |
| 2023/0335922 | A1* | 10/2023 | Wang | H01Q 9/42 |

* cited by examiner

ELECTRONIC DEVICE

CROSS-REFERENCE TO RELATED APPLICATION

This application claims the priority benefit of Taiwan application serial no. 111131820 filed on Aug. 24, 2022. The entirety of the above-mentioned patent application is hereby incorporated by reference herein and made a part of this specification.

BACKGROUND

Technical Field

The disclosure relates to an electronic device, and in particular relates to an electronic device having an antenna.

Description of Related Art

Currently, how to configure an antenna in an electronic device with a metal casing is a research goal in this field.

SUMMARY

An electronic device, which has a metal casing and an antenna, is provided.

An electronic device of the disclosure includes a metal back cover, a metal frame, a first antenna module, and a second antenna module. The metal frame includes a first disconnection portion, a second disconnection portion, a first connection portion, and a second connection portion. The first connection portion connected to the metal back cover is located on one side of the first disconnection portion, the second connection portion connected to the metal back cover is located on one side of the second disconnection portion. The first disconnection portion is located between the first connection portion and the second disconnection portion. The first disconnection portion is separated from the first connection portion, the metal back cover, and the second disconnection portion, and a first slot is formed by the first connection portion, the first disconnection portion and the metal back cover. The second disconnection portion is connected to the second connection portion and is separated from the metal back cover, and a second slot is formed by the second disconnection portion, the second connection portion and the metal back cover. The first slot communicates with the second slot. The first antenna module is disposed adjacent to the first disconnection portion and connected to the first disconnection portion, and a first antenna path is formed by the first antenna module and the first disconnection portion. The second antenna module is disposed adjacent to the second disconnection portion and connected to the second disconnection portion, and a second antenna path is formed by the second antenna module, the second disconnection portion, the second connection portion and the metal back cover, and a third antenna path is formed by the second antenna module, the second disconnection portion and the metal back cover.

Based on the above, the first disconnection portion of the metal frame of the electronic device of the disclosure is separated from the first connection portion, the metal back cover, and the second disconnection portion to form a first slot. The second disconnection portion of the metal frame is connected to the second connection portion and separated from the metal back cover to form a second slot. The first slot communicates with the second slot. The first antenna module is disposed adjacent to the first disconnection portion and connected to the first disconnection portion, and collectively forms a first antenna path with the first disconnection portion. The second antenna module is disposed adjacent to the second disconnection portion and connected to the second disconnection portion, and collectively forms a second antenna path and a third antenna path with the second disconnection portion and a part of the metal back cover. Therefore, the electronic device of the disclosure not only has a metal casing and has a good appearance, but also may be provided with two antenna modules to achieve the effect of a broadband antenna.

DETAILED DESCRIPTION OF DISCLOSED EMBODIMENTS

Figure 1A:
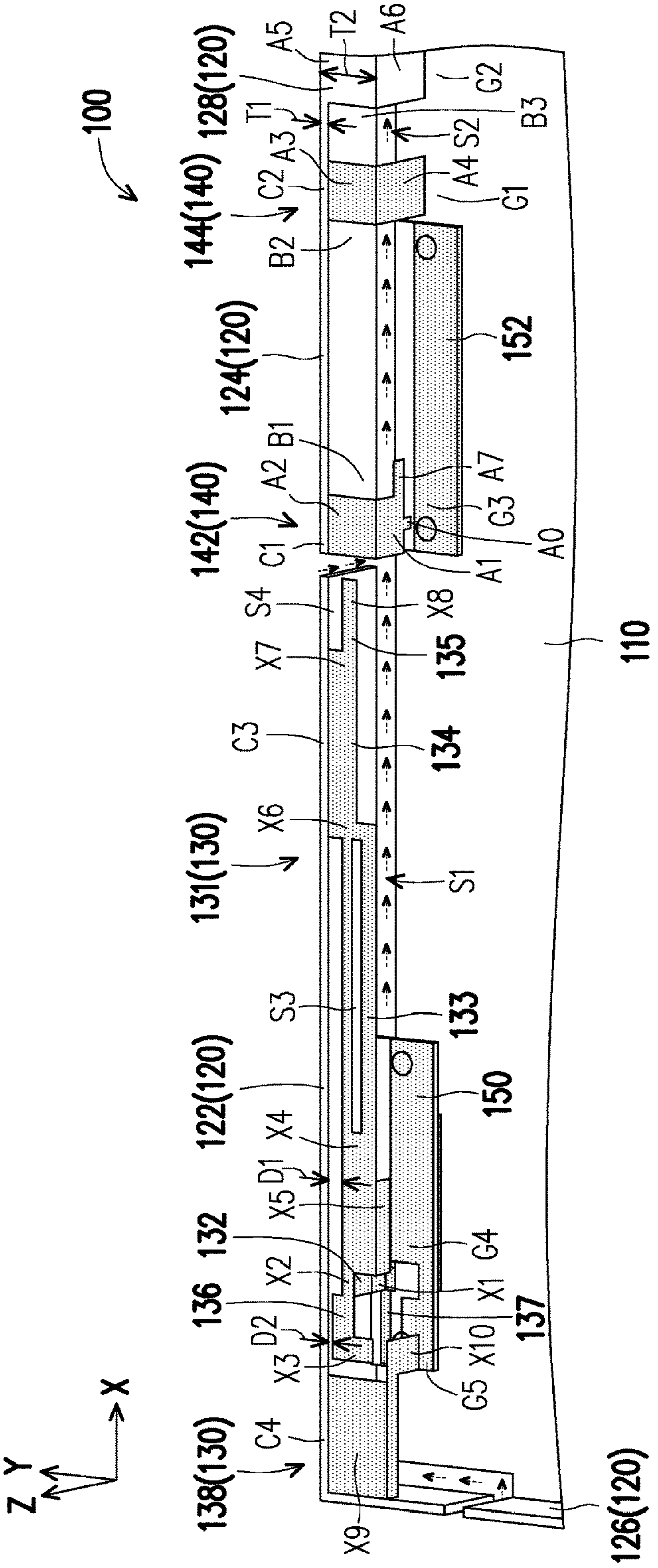
FIG. 1A is a partial schematic diagram of an electronic device according to an embodiment of the disclosure.
Figure 1B:
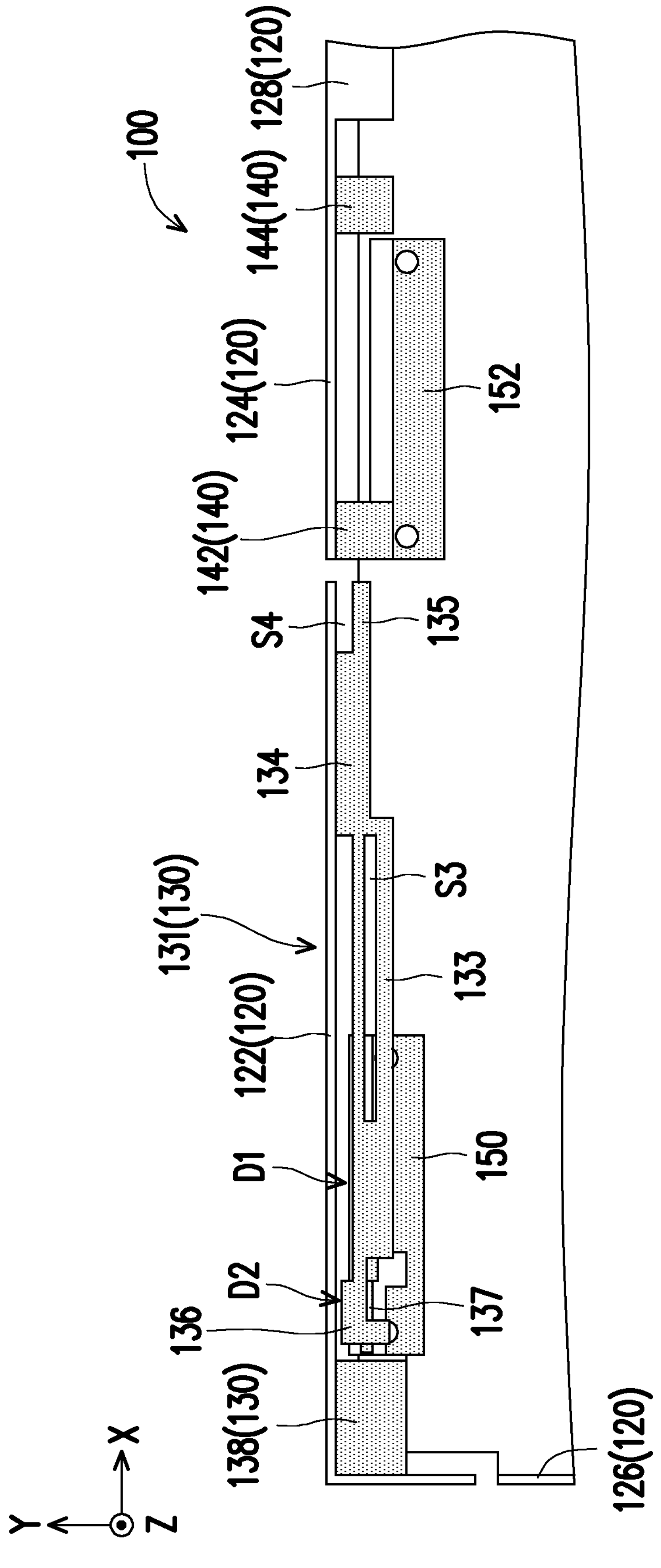
FIG. 1B is a schematic diagram of another viewing angle of FIG. 1A.

FIG. 1A is a partial schematic diagram of an electronic device according to an embodiment of the disclosure. FIG. 1B is a schematic diagram of another viewing angle of FIG. 1A. Specifically, FIG. 1B is a top view of FIG. 1A. Referring to FIG. 1A and FIG. 1B, the electronic device 100 of this embodiment includes a metal back cover 110, a metal frame 120, a first antenna module 130, and a second antenna module 140. In this embodiment, the electronic device 100 is, for example, a tablet, the first antenna module 130 is, for example, a 5G NR Sub-6 antenna, and the second antenna module 140 is, for example, a WiFi 6E antenna, but not limited thereto. The metal back cover 110 is on the XY plane, and the metal frame 120 is erected on the metal back cover 110 and extends along the Z direction.

The metal frame 120 includes a first disconnection portion 122, a second disconnection portion 124, a first connection portion 126, and a second connection portion 128. The first connection portion 126 connected to the metal back cover 110 is located on one side of the first disconnection portion 122, the second connection portion 128 connected to the metal back cover 110 is located on one side of the second disconnection portion 124. Exactly, the first connection portion 126 and the second connection portion 128 are located on two sides of the first disconnection portion 122 and the second disconnection portion 124, and are connected to the metal back cover 110.

The first disconnection portion 122 is located between the first connection portion 126 and the second disconnection portion 124, the first disconnection portion 122 is separated from the first connection portion 126, the metal back cover 110 and the second disconnection portion 124, so as to form a first slot S1. Namely, the first slot S1 is at least formed by the first connection portion 126, the first disconnection portion 122 and the metal back cover 110. That is to say, the first slot S1 defines the range of the first disconnection portion 122. In this embodiment, the first slot S1 is, for example, U-shaped, but not limited thereto. The width of the first slot S1 is, for example, 2 mm, but not limited thereto.

The second disconnection portion 124 is connected to the second connection portion 128 and separated from the metal back cover 110 to form a second slot S2, and the first slot S1 communicates with the second slot S2. In other words, the second slot S2 is formed by the second disconnection portion 124, the second connection portion 128 and the metal back cover 110. In this embodiment, the width of the second slot S2 is, for example, 2 mm, but not limited thereto.

The first antenna module 130 may be disposed in a small space (about 78 mm in length, about 13 mm in width, and about 7 mm in height). The first antenna path is formed by the first antenna module 130 and the first disconnection portion 122. Namely, the first antenna module 130 is disposed adjacent to the first disconnection portion 122 and connected to the first disconnection portion 122, and collectively forms a first antenna path with the first disconnection portion 122. Specifically, the first antenna module 130 includes a first radiator 131 (path area from position X1 to position X8) and a second radiator 138 (path area from position X9 to position X10). The first radiator 131 is located between the second radiator 138 and the second antenna module 140.

The first radiator 131 is disposed adjacent to the first disconnection portion 122 and connected to the first disconnection portion 122. Specifically, the first radiator 131 includes a first segment 132 (path area from position X1 to position X2), a second segment 133 (path area from position X2 to position X4, path area from position X4 to position X6, and area of position X5), a third segment 134 (path area from position X6 to position X7), and a fourth segment 135 (path area from position X7 to position X8) that are sequentially connected.

The first segment 132 includes a first feeding end (position X1). The first feeding end is close to the second radiator 138. The first segment 132 may be disposed on the XZ plane and extend along the Z axis at position X1.

The second segment 133 in the path area from position X2 to position X4 and in the path area from position X4 to position X6 may be disposed on the XY plane and extends along the X axis, while the second segment 133 in the area of position X5 may be disposed in the XZ plane and extends along the Z axis.

The third segment 134 and the fourth segment 135 may be disposed on the XY plane and extend in the direction towards the second antenna module 140 along the X axis, and are parallel to the extension direction of the first disconnection portion 122 (the X axis of FIG. 1A, i.e., the left-right direction).

The second segment 133 and the fourth segment 135 are separated from the first disconnection portion 122, while the third segment 134 is connected to the first disconnection portion 122.

The first radiator 131 includes a fifth segment 136 (path area from position X2 to position X3), which may be disposed on the XY plane and extends from the first segment 132 in the direction towards the second radiator 138 along the X axis, and extends along the Y axis at position X3. The fifth segment 136 is separated from the first disconnection portion 122, and the distance D2 between the fifth segment 136 and the first disconnection portion 122 is less than the distance D1 between the second segment 133 and the first disconnection portion 122.

The electronic device 100 further includes a first antenna circuit board 150, and the first radiator 131 includes a sixth segment 137, which extends from the first feeding end (position X1) and is disposed on the first antenna circuit board 150, and extends along the X axis. In one embodiment, the positive end of the coaxial transmission line (not shown) is connected to the first feeding end (position X1) and is electrically connected to the motherboard module card (not shown), and the negative end of the coaxial transmission line (not shown) is electrically connected to the ground plane (position G4) of the first antenna circuit board 150 and the metal back cover 110.

The second radiator 138 is disposed adjacent to the first disconnection portion 122, and the second radiator 138 is connected to the first disconnection portion 122 at position X9. The second radiator 138 is connected to the ground plane (position G5) of the first antenna circuit board 150 at position X10.

In this embodiment, the first antenna path is collectively formed from the first radiator 131, along a part of the first disconnection portion 122 (path area from position C3 to position C4), the second radiator 138 to position G5 of the first antenna circuit board 150.

The first antenna path at least excites a first frequency band, and the length of the first antenna path is 0.5 times the wavelength of the first frequency band. In this embodiment, the first frequency band is, for example, low frequency (617 MHz to 960 MHz). Of course, in addition to the first frequency band, the first antenna path may also excite the frequency bands of mid-high frequency (1710 MHz to 2690 MHz), ultra-high frequency (3300 MHz to 5000 MHz) and LAA B252 and B255 (5150 MHz to 5850 MHz). Therefore, the first antenna module 130 may support the frequency band of 5G NR Sub-6.

In addition, in this embodiment, the second segment 133 includes a third slot S3 located internally, and there is a fourth slot S4 between the fourth segment 135 and the first disconnection portion 122. The third slot S3 and the fourth slot S4 may be used to increase the impedance matching bandwidth of the LAA frequency band of 5150 MHz to 5850 MHz.

On the other hand, the second antenna module 140 (the path area from position A2 through position A1, position A0 and then to position A7, and the path area from position A3 to position A4) may be disposed in a small space (length about 38 mm, width about 6 mm, and height about 7 mm). In this embodiment, the second antenna module 140 is disposed adjacent to the second disconnection portion 124 and connected to the second disconnection portion 124 at positions A2 and A3.

In this embodiment, the second antenna module 140, the second disconnection portion 124, and a part of the metal back cover 110 collectively form a second antenna path and a third antenna path. Exactly, the second antenna path is formed by the second antenna module 140, the second disconnection portion 124, the second connection portion 128 and the metal back cover 110. The third antenna path is formed by the second antenna module 140, the second disconnection portion 124 and the metal back cover 110. Details are given below.

Figure 2A:
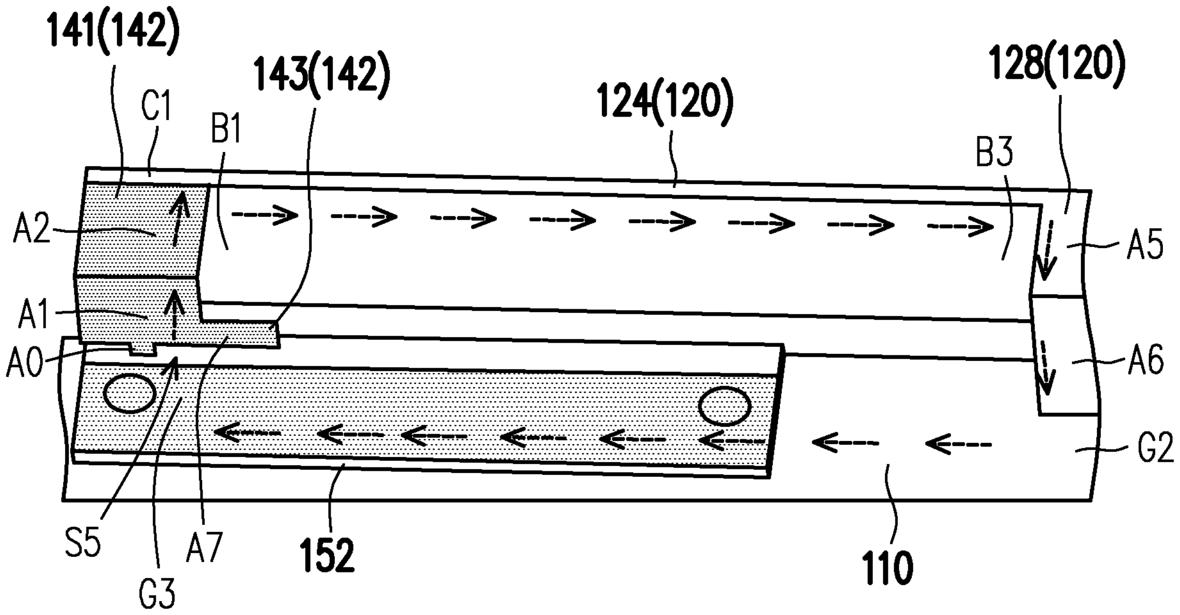
FIG. 2A is a schematic diagram of a second antenna path of the electronic device of FIG. 1A.

FIG. 2A is a schematic diagram of a second antenna path of the electronic device of FIG. 1A. Referring to FIG. 1A and FIG. 2A, the second antenna module 140 includes a third radiator 142 (path area from position A2 through position A1, position A0 to position A7) and a fourth radiator 144 (FIG. 1A, path area from position A3 to position A4). The third radiator 142 is disposed adjacent to the second disconnection portion 124. The third radiator 142 includes a seventh segment 141 (path area from position A0, position A1 to position A2) and an eighth segment 143 (path area from position A1, position A0 to position A7).

The seventh segment 141 at position A2 is disposed on the XY plane and extends along the Y axis (FIG. 1A). The seventh segment 141 at positions A1 and A0 is disposed on the XZ plane and extends along the Z axis (FIG. 1A). The seventh segment 141 includes a second feeding end (position A0), and the third radiator 142 is connected to the second disconnection portion 124 at position A2.

As shown in FIG. 2A, the electronic device 100 further includes a second antenna circuit board 152 close to the eighth segment 143. The eighth segment 143 extends from the second feeding end (position A0), the eighth segment 143 at position A7 is disposed on the XZ plane and extends along the X axis, and there is a fifth slot S5 between the eighth segment 143 and the second antenna circuit board 152.

The third radiator 142, the second disconnection portion 124 (path area from position B1 to position B3), the second connection portion 128 (path area from position A5 to position A6), the portion of the metal back cover 110 between the third radiator 142 and the second connection portion 128 (position G2) and/or the second antenna circuit board 152 (position G3) collectively form the second antenna path.

Figure 2B:
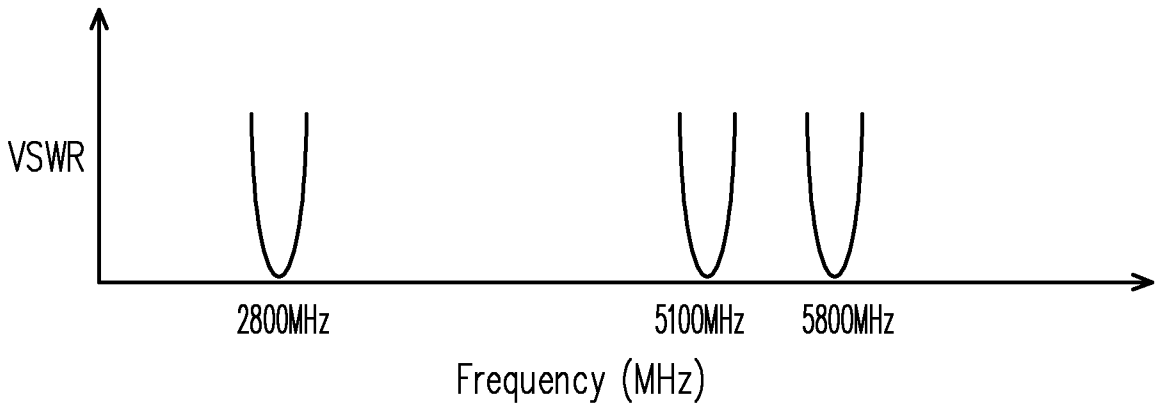
FIG. 2B is a frequency-VSWR relationship diagram of the second antenna path of FIG. 2A.

FIG. 2B is a frequency-voltage standing wave ratio (VSWR) relationship diagram of the second antenna path of FIG. 2A. Referring to FIG. 2B, in this embodiment, the second antenna path shown in FIG. 2A at least excites a second frequency band. The second frequency band is, for example, 2800 MHz, and the length of the second antenna path is 1 times the wavelength of the second frequency band. The curves of 2800 MHz and 5100 MHz in FIG. 2B are the frequency bands excited by the second antenna path, and the curve of 5800 MHz is the frequency band coupled by the fifth slot S5 between the eighth segment 143 and the second antenna circuit board 152.

Figure 3A:
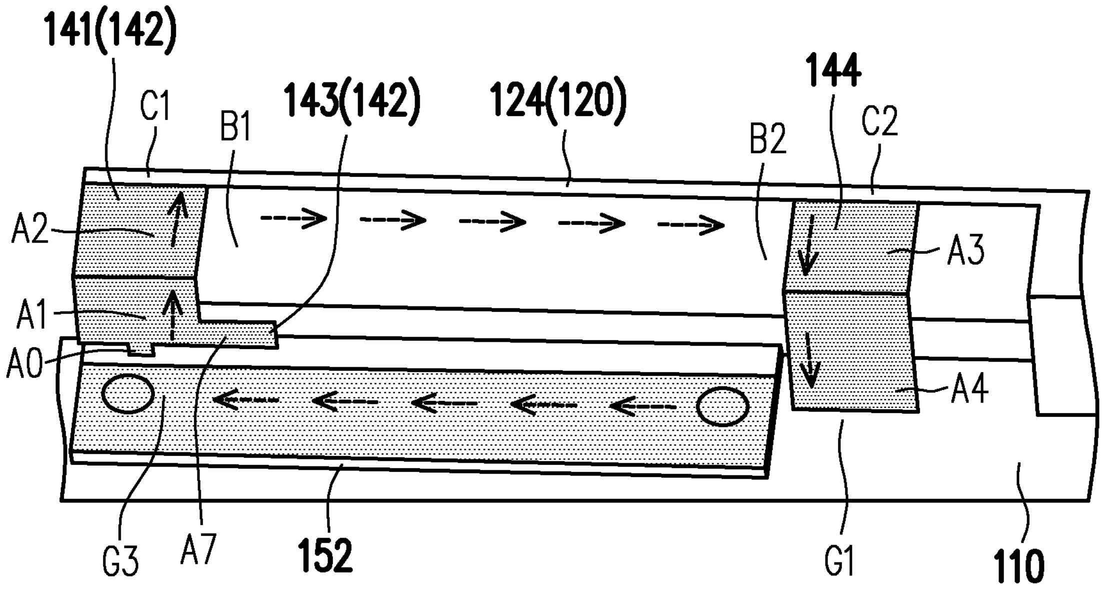
FIG. 3A is a schematic diagram of a third antenna path of the electronic device of FIG. 1A.

FIG. 3A is a schematic diagram of a third antenna path of the electronic device of FIG. 1A. Referring to FIG. 3A, in this embodiment, the fourth radiator 144 is disposed adjacent to the second disconnection portion 124 and connected to the second disconnection portion 124 and the metal back cover 110. The fourth radiator 144 is located between the third radiator 142 and the second connection portion 128. The fourth radiator 144 at position A3 is disposed on the XY plane and extends along the Y axis (FIG. 1A). The fourth radiator 144 at position A4 is disposed on the XZ plane and extends along the Z axis (FIG. 1A).

The third radiator 142, a part of the second disconnection portion 124 (path area from position C1 through positions B1, B2 to position C2), the portion of the fourth radiator 144 and the metal back cover 110 between the third radiator 142 and the fourth radiator 144 (position G1) and/or the second antenna circuit board 152 (position G3) collectively form the third antenna path.

Figure 3B:
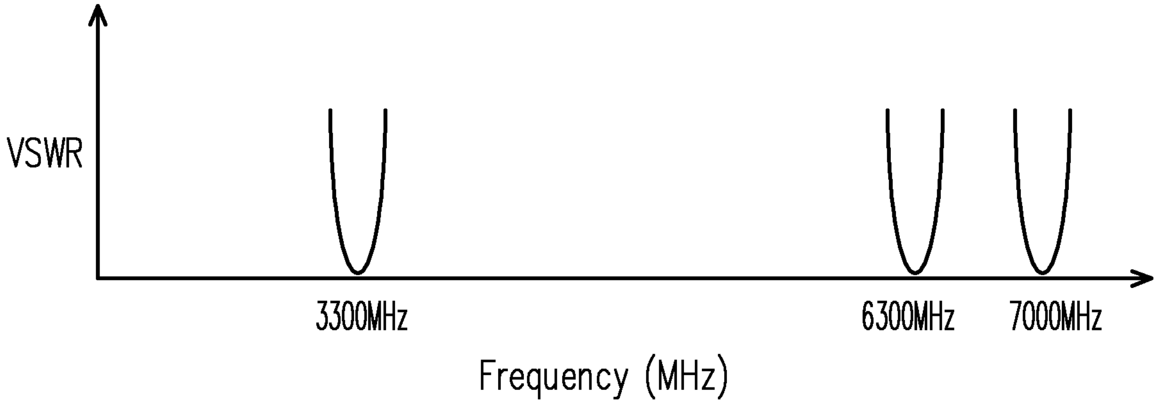
FIG. 3B is a frequency-VSWR relationship diagram of the third antenna path of FIG. 3A.

FIG. 3B is a frequency-VSWR relationship diagram of the third antenna path of FIG. 3A. Referring to FIG. 3B, in this embodiment, the third antenna path at least excites a third frequency band. The third frequency band is, for example, 3300 MHz, and the length of the third antenna path is 1 times the wavelength of the third frequency band. The curves of 3300 MHz and 6300 MHz in FIG. 3B are frequency bands excited by the third antenna path, and the curve of 7000 MHz is the frequency band excited by the eighth segment 143.

The second antenna module 140 may increase the impedance matching of the WiFi 6E band in the 5150 MHz to 7125 MHz range by adjusting the length of the eighth segment 143 and the position of the fourth radiator 144 relative to the second connection portion 128 (e.g., moving towards the second connection portion 128).

It may be seen from FIG. 2A to FIG. 3B that in this embodiment, the second antenna module 140 may excite the WiFi 6E low frequency (2400 to 2500 MHz) and high frequency (5150 to 7125 MHz) bands through the second antenna path and the third antenna path.

Figure 4:
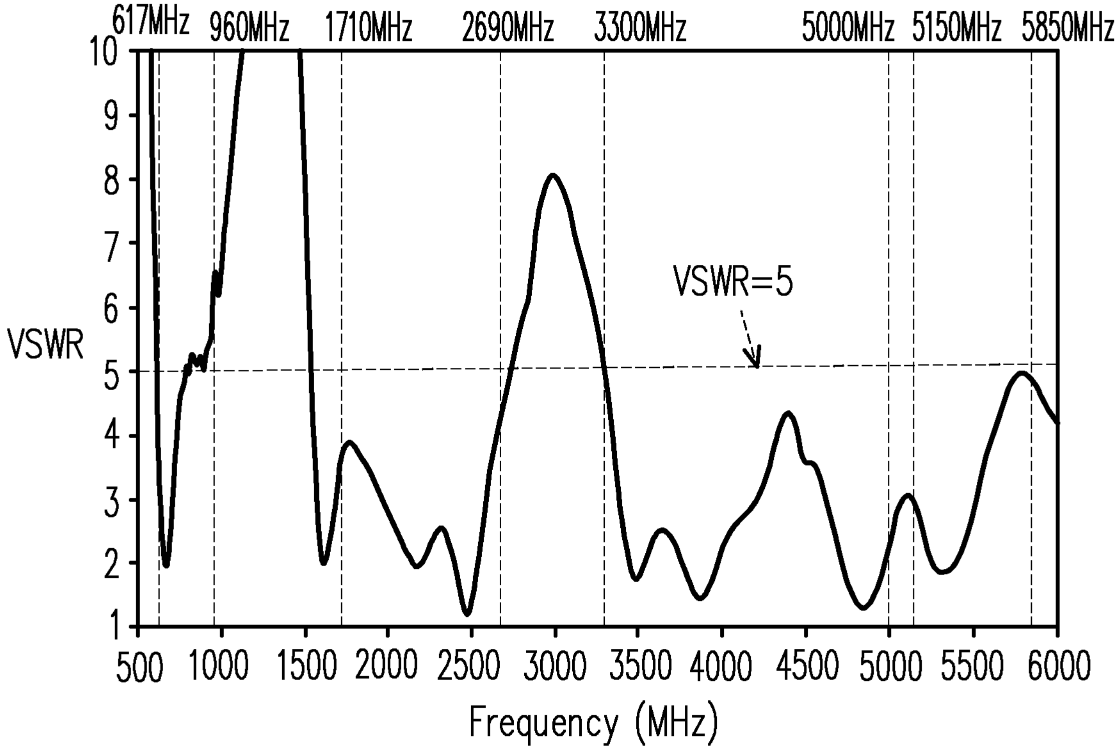
FIG. 4 is a frequency-VSWR relationship diagram of the first antenna module of the electronic device of FIG. 1A.

FIG. 4 is a frequency-VSWR relationship diagram of the first antenna module of the electronic device of FIG. 1A. Referring to FIG. 4, in this embodiment, the first antenna module 130 performs well in the low frequency (617 MHz to 960 MHz), mid-high frequency (1710 MHz to 2690 MHz), ultra-high frequency (3300 MHz to 5000 MHz), and LAA B252 and B255 (5150 MHz to 5850 MHz) bands, with a VSWR of less than 5 in all these ranges.

Figure 5:
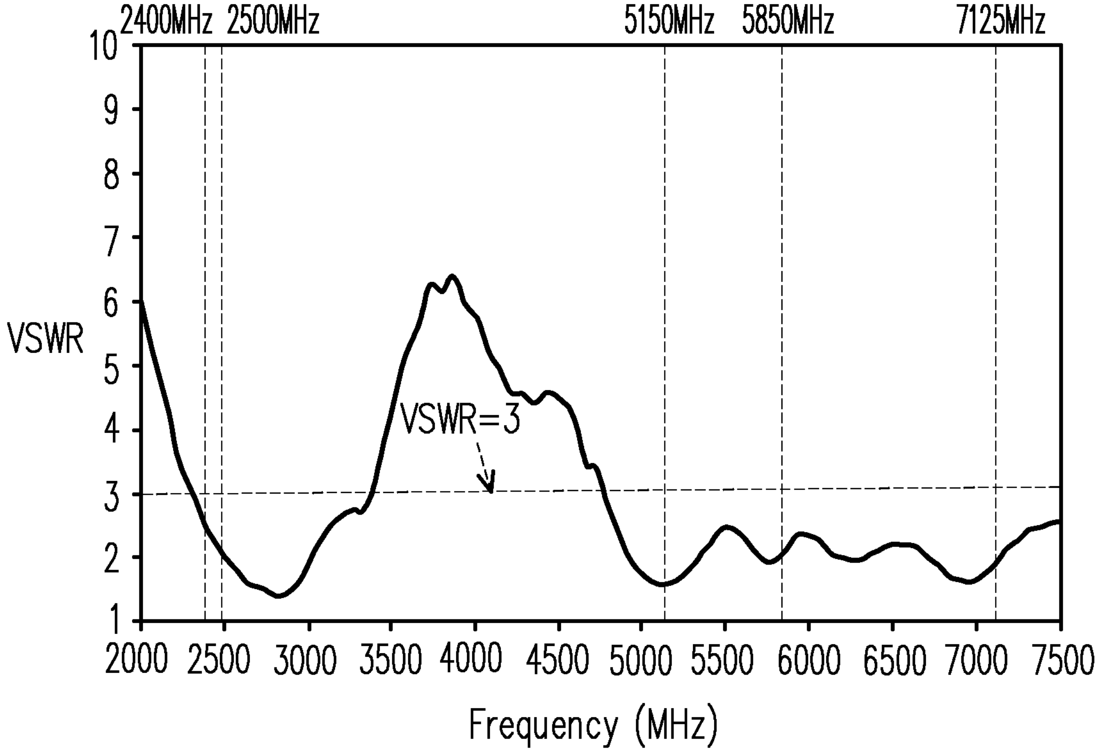
FIG. 5 is a frequency-VSWR relationship diagram of the second antenna module of the electronic device of FIG. 1A.

FIG. 5 is a frequency-VSWR relationship diagram of the second antenna module of the electronic device of FIG. 1A. Referring to FIG. 5, in this embodiment, the second antenna module 140 performs well in the low frequency (2400 MHz to 2500 MHz) and high frequency (5150 MHz to 7125 MHz) bands, with a VSWR of less than 3 in all these ranges.

Returning to FIG. 1A, in this embodiment, the first antenna module 130 and the first disconnection portion 122 are separated from the structures on the left and right sides through the first slot S1, thereby having good isolation. On the other hand, the second antenna module 140 is separated from the first antenna module 130 on the left through the first slot S1. In addition, although the right side of the second antenna module 140 is provided with electronic components (not shown) such as lenses, in this embodiment, the thickness T2 of the second connection portion 128 is greater than the thickness T1 of the second disconnection portion 124, and a corner is formed at the junction of the second connection portion 128 and the second disconnection portion 124. The second connection portion 128 may be used to separate the interference between the second antenna module 140 and the electronic components on the right thereof, thereby having good isolation.

Moreover, the electronic device 100 also achieves good isolation by keeping the first feeding end (position X1) and the second feeding end (position A0) away from each other, so as to reduce the probability of mutual interference between the overlapping frequency bands of the first antenna module 130 and the second antenna module 140 (e.g., frequency bands of 2400 MHz to 2500 MHz and 5150 MHz to 5850 MHz).

Figure 6:
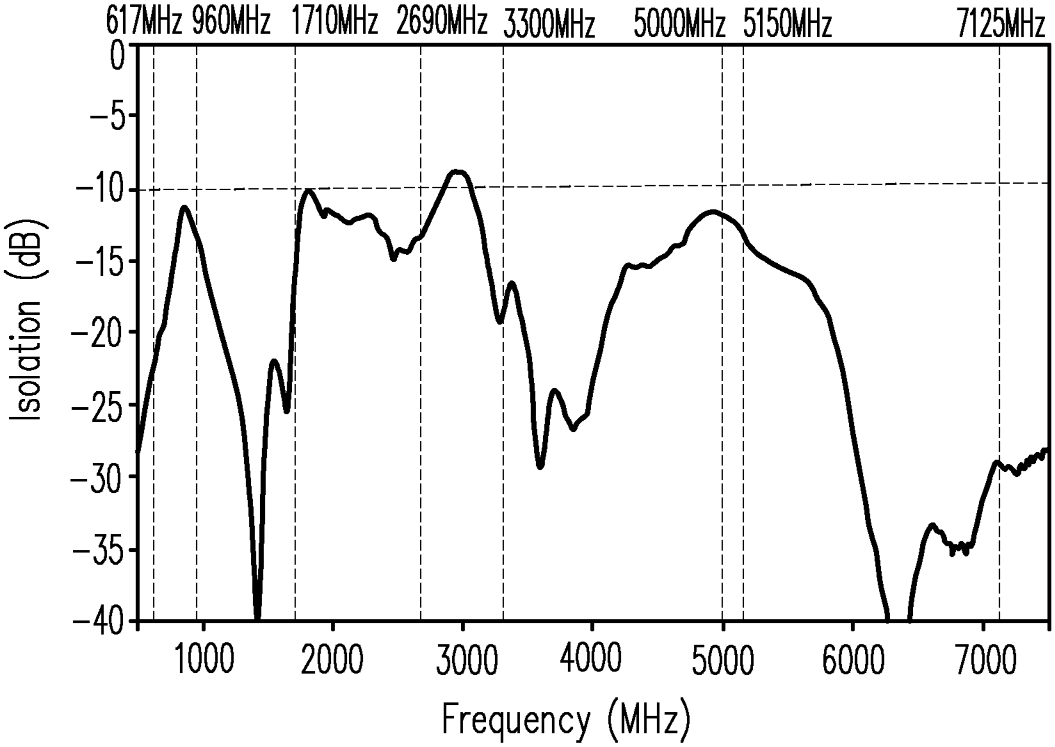
FIG. 6 is a frequency-isolation relationship diagram of the first antenna module and the second antenna module of the electronic device shown in FIG. 1A.

FIG. 6 is a frequency-isolation relationship diagram of the first antenna module and the second antenna module of the electronic device shown in FIG. 1A. Referring to FIG. 6, in this embodiment, the isolation between the first antenna module 130 and the second antenna module 140 is at least 10 dB at 500 MHz to 7500 MHz, thereby having a good performance.

Figure 7:
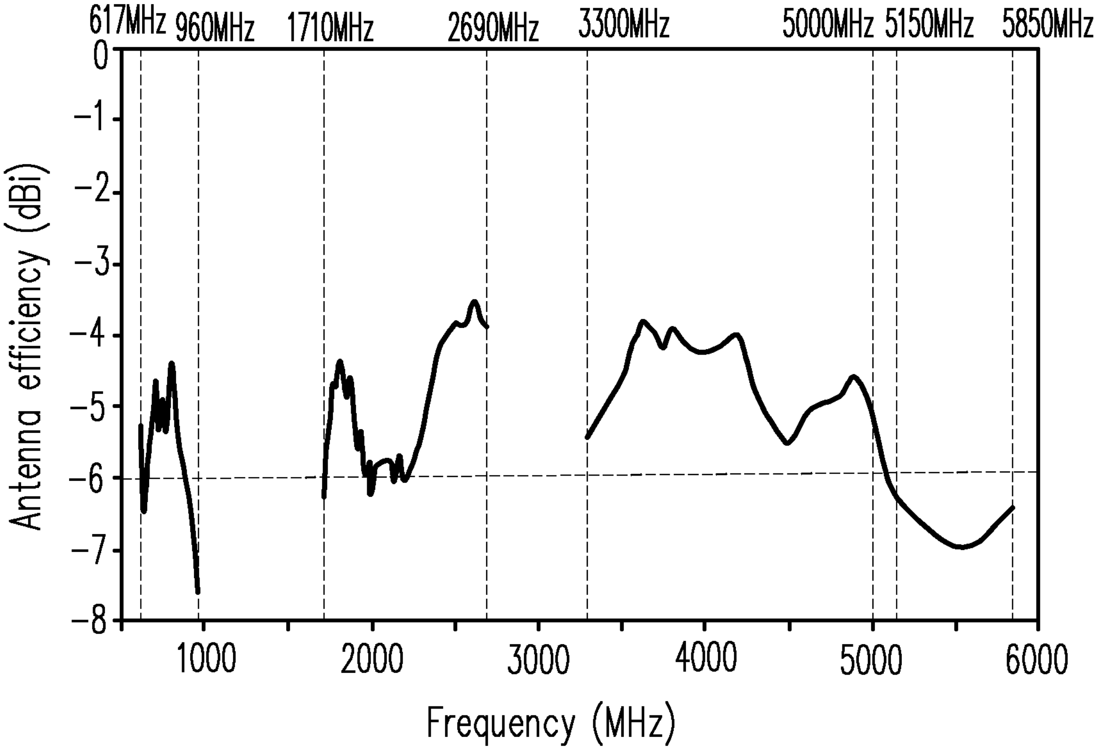
FIG. 7 is a frequency-antenna efficiency relationship diagram of the first antenna module of the electronic device of FIG. 1A.

FIG. 7 is a frequency-antenna efficiency relationship diagram of the first antenna module of the electronic device of FIG. 1A. Referring to FIG. 7, in this embodiment, the average efficiency of the first antenna module 130 is −4.5 to −7.5 dBi in the low frequency range (617 MHz to 960 MHz), −4 to −6 dBi in the mid-high frequency range (1710 MHz to 2690 MHz) and ultra-high frequency range (3300 MHz to 5000 MHz), and −6.5 to −7 dBi in the LAA B252 and B255 frequency range (5150 MHz to 5850 MHz), thereby having good performance.

Figure 8:
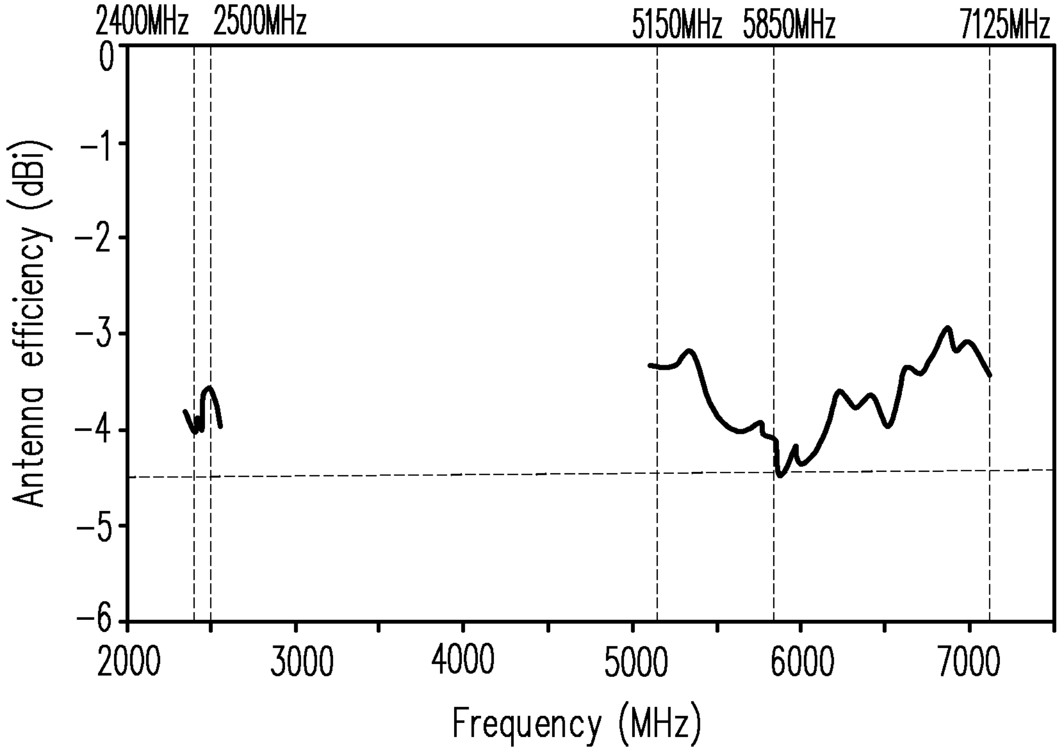
FIG. 8 is a frequency-antenna efficiency relationship diagram of the second antenna module of the electronic device of FIG. 1A.

FIG. 8 is a frequency-antenna efficiency relationship diagram of the second antenna module of the electronic device of FIG. 1A. Referring to FIG. 8, in this embodiment, the average efficiency of the second antenna module 140 is −3.5 to −4 dBi in the low frequency range (2400 MHz to 2500 MHz), and −3.5 to −4.5 dBi in the high frequency range (5150 MHz to 7125 MHz), thereby having good performance.

It is worth mentioning that, in this embodiment, the first antenna module 130 and the second antenna module 140 may be disposed at four corners of the electronic device 100. That is, the electronic device 100 may be configured with four first antenna modules 130 (5G NR Sub-6 antennas) and four second antenna modules 140 (WiFi 6E antennas), and may support a 4×4 MIMO multiple antenna configuration.

To sum up, the first disconnection portion of the metal frame of the electronic device of the disclosure is separated from the first connection portion, the metal back cover, and the second disconnection portion to form a first slot. The second disconnection portion of the metal frame is connected to the second connection portion and separated from the metal back cover to form a second slot. The first slot communicates with the second slot. The first antenna module is disposed adjacent to the first disconnection portion and connected to the first disconnection portion, and collectively forms a first antenna path with the first disconnection portion. The second antenna module is disposed adjacent to the second disconnection portion and connected to the second disconnection portion, and collectively forms a second antenna path and a third antenna path with the second disconnection portion and a part of the metal back cover. Therefore, the electronic device of the disclosure not only has a metal casing and has a good appearance, but also may be provided with two antenna modules to achieve the effect of a broadband antenna.

What is claimed is:

1. An electronic device, comprising:

a metal back cover;

a metal frame, comprising a first disconnection portion, a second disconnection portion, a first connection portion, and a second connection portion, wherein the first connection portion connected to the metal back cover is located on one side of the first disconnection portion, the second connection portion connected to the metal back cover is located on one side of the second disconnection portion, the first disconnection portion is located between the first connection portion and the second disconnection portion, the first disconnection portion is separated from the first connection portion, the metal back cover, and the second disconnection portion, a first slot is formed by the first connection portion, the first disconnection portion and the metal back cover, the second disconnection portion separated from the metal back cover is connected to the second connection portion connected to the metal back cover, a second slot is formed by the second disconnection portion, the second connection portion and the metal back cover, and the first slot communicates with the second slot;

a first antenna module, disposed adjacent to the first disconnection portion and connected to the first disconnection portion, and a first antenna path being formed by the first antenna module and the first disconnection portion; and a second antenna module, disposed adjacent to the second disconnection portion and connected to the second disconnection portion, a second antenna path being formed by the second antenna module, the second disconnection portion, the second connection portion and the metal back cover, and a third antenna path being formed by the second antenna module, the second disconnection portion and the metal back cover, wherein the first antenna module is a 5G NR Sub-6 antenna, and the second antenna module is a WiFi 6E antenna, wherein the first antenna module comprises:

a first radiator, comprising a first feeding end, and disposed adjacent to the first disconnection portion and connected to the first disconnection portion;

a second radiator, disposed adjacent to the first disconnection portion and connected to the first disconnection portion, wherein the first radiator is located between the second radiator and the second antenna module, the first feeding end is close to the second radiator, and the first antenna path being formed by the first radiator, the first disconnection portion and the second radiator.

2. The electronic device according to claim 1, wherein the first radiator comprises a first segment, a second segment, a third segment, and a fourth segment that are sequentially connected, the first segment comprises the first feed end, the second segment, the third segment and the fourth segment extend toward a direction close to the second antenna module and are parallel to an extending direction of the first disconnection portion, the second segment and the fourth segment are separated from the first disconnection portion, and the third segment is connected to the first disconnection portion.

3. The electronic device according to claim 2, wherein the second segment comprises a third slot located internally, and a fourth slot is located between the fourth segment and the first disconnection portion.

4. The electronic device according to claim 2, wherein the first radiator comprises a fifth segment extending from the first segment toward a direction close to the second radiator, the fifth segment is separated from the first slot, and a distance between the fifth segment and the first disconnection portion is less than a distance between the second segment and the first disconnection portion.

5. The electronic device according to claim 1, further comprising a first antenna circuit board, the first radiator comprising a sixth segment extending from the first feeding end and disposed on the first antenna circuit board.

6. The electronic device according to claim 1, wherein the first antenna path excites a first frequency band, and a length of the first antenna path is 0.5 times a wavelength of the first frequency band.

7. The electronic device according to claim 1, wherein the second antenna module comprises:

a third radiator, comprising a second feeding end, the third radiator disposed adjacent to the second disconnection portion and connected to the second disconnection portion, wherein the second antenna path is formed by the third radiator, the second disconnection portion, the second connection portion, and the metal back cover; and a fourth radiator, disposed adjacent to the second disconnection portion and connected to the second disconnection portion and the metal back cover, wherein the fourth radiator is located between the third radiator and the second connection portion, wherein the third antenna path is formed by the third radiator, the second disconnection portion, the fourth radiator, and the metal back cover.

8. The electronic device according to claim 7, further comprising a second antenna circuit board, wherein the third radiator comprises a seventh segment and an eighth segment, the seventh segment comprises the second feeding end and is connected to the second disconnection portion, the eight segment extend from the second feeding end and a fifth slot is formed between the eighth segment and the second antenna circuit board.

9. The electronic device according to claim 1, wherein a thickness of the second connection portion is greater than a thickness of the second disconnection portion, and a corner is formed at a junction of the second connection portion and the second disconnection portion.

10. The electronic device according to claim 1, wherein the second antenna path excites a second frequency band, and a length of the second antenna path is 1 times a wavelength of the second frequency band.

11. The electronic device according to claim 1, wherein the third antenna path excites a third frequency band, and a length of the third antenna path is 1 times a wavelength of the third frequency band.

12. The electronic device according to claim 1, wherein the first antenna module excites low frequency (617 MHz to 960 MHz), mid-high frequency (1710 MHz to 2690 MHz), ultra-high frequency (3300 MHz to 5000 MHz), and LAA B252 and B255 (5150 MHz to 5850 MHz) bands, and the second antenna module excites low frequency (2400 MHz to 2500 MHZ) and high frequency (5150 MHz to 7125 MHz) bands.

* * * * *